(12) United States Patent
Van Kampen et al.

(10) Patent No.: US 10,403,442 B2
(45) Date of Patent: Sep. 3, 2019

(54) METHOD OF MANUFACTURING A MEMS DVC DEVICE

(71) Applicant: CAVENDISH KINETICS, INC., San Jose, CA (US)

(72) Inventors: Robertus Petrus Van Kampen, S-Hertogenbosch (NL); Ramadan A. Alhalabi, Santa Clara, CA (US)

(73) Assignee: CAVENDISH KINETICS, INC., San Jose, CA (US)

( * ) Notice: Subject to any disclaimer, the term of this patent is extended or adjusted under 35 U.S.C. 154(b) by 197 days.

(21) Appl. No.: 15/629,161

(22) Filed: Jun. 21, 2017

(65) Prior Publication Data

US 2017/0287646 A1 Oct. 5, 2017

Related U.S. Application Data

(62) Division of application No. 14/779,564, filed as application No. PCT/US2014/032725 on Apr. 2, 2014, now Pat. No. 9,711,289.

(Continued)

(51) Int. Cl.
*H01G 5/011* (2006.01)
*H01G 5/16* (2006.01)
(Continued)

(52) U.S. Cl.
CPC ............ *H01G 5/011* (2013.01); *H01G 5/013* (2013.01); *H01G 5/16* (2013.01); *H01G 5/18* (2013.01); *H01H 59/0009* (2013.01)

(58) Field of Classification Search
CPC .......... H01G 5/011; H01G 5/013; H01G 5/16; H01G 5/18; H01H 59/0009
See application file for complete search history.

(56) References Cited

U.S. PATENT DOCUMENTS 6,727,590 B2 * 4/2004 Izumitani ............ H01L 23/5226
257/208
9,711,291 B2 * 7/2017 Knipe .................. B81B 3/0051
(Continued)

FOREIGN PATENT DOCUMENTS

CN        101231910 A       7/2008
JP        2012-176445 A     9/2012
(Continued)

OTHER PUBLICATIONS

International Search Report and Written Opinion dated Jul. 18, 2014, issued in International Application No. PCT/US2014/032725.
(Continued)

*Primary Examiner* — Minh N Trinh
(74) *Attorney, Agent, or Firm* — Patterson & Sheridan, LLP; Steven Versteeg

(57) ABSTRACT

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to the one or more electrodes that cause the plate to move is reduced and capacitance modulation is reduced or even eliminated.

11 Claims, 8 Drawing Sheets

Related U.S. Application Data

(60) Provisional application No. 61/817,385, filed on Apr. 30, 2013, provisional application No. 61/817,251, filed on Apr. 29, 2013.

(51) Int. Cl.
  *H01H 59/00* (2006.01)
  *H01G 5/18* (2006.01)
  *H01G 5/013* (2006.01)

(56) References Cited

U.S. PATENT DOCUMENTS

| | | | |
|---|---|---|---|
| 10,167,189 B2* | 1/2019 | Zhang | B81B 7/0048 |
| 2004/0124497 A1 | 7/2004 | Rottenberg et al. | |
| 2012/0068278 A1 | 3/2012 | Knipe et al. | |
| 2012/0255841 A1 | 10/2012 | Shin | |
| 2017/0287646 A1* | 10/2017 | Van Kampen | H01G 5/16 |

FOREIGN PATENT DOCUMENTS

| | | |
|---|---|---|
| JP | 2013-051297 A | 3/2013 |
| WO | 2012/102119 A1 | 8/2012 |
| WO | 2013/028546 A1 | 2/2013 |
| WO | 2013/033613 A2 | 3/2013 |
| WO | 2013/188633 A1 | 12/2013 |

OTHER PUBLICATIONS

Written Opinion of the International Preliminary Examining Authority, dated Mar. 25, 2015, issued in International Patent Application No. PCT/US2014/032725.

Office action dated Nov. 21, 2017 for Japanese Patent Application No. 2016-510687.

Office action dated May 22, 2017 for Chinese Patent Application No. 201480022523.4.

Office Action issued in corresponding Japanese Patent Application No. 2016-510687, dated Jul. 24, 2018 (8 pages).

* cited by examiner

US 10,403,442 B2

METHOD OF MANUFACTURING A MEMS DVC DEVICE

CROSS-REFERENCE TO RELATED APPLICATIONS

This application is a divisional of co-pending U.S. patent application Ser. No. 14/779,564, filed Apr. 2, 2014, now U.S. Pat. No. 9,711,289, which application is the national stage filing of PCT/US2014/032725, which claims benefit of U.S. Provisional Patent Application Ser. No. 61/817,385, filed Apr. 30, 2013 and U.S. Provisional Patent Application Ser. No. 61/817,251, filed Apr. 29, 2013. Each of the aforementioned related patent applications is herein incorporated by reference.

BACKGROUND OF THE INVENTION

Field of the Invention

Embodiments of the present invention generally relate to a micro-electromechanical system (MEMS) digital variable capacitor (DVC).

Description of the Related Art

United States Patent Application Publication No. 2012/0068278 A1 to Knipe et al. discloses a MEMS DVC having an RF electrode, a pull up electrode, a pull-in electrode and a cantilever structure.

Some MEMS DVC devices are based on a movable MEMS plate with a control-electrode above (i.e., pull-up or pull-off or PU electrode) and below (i.e., pull-on or pull-in or pull-down or PD electrode) the movable MEMS plate (i.e., movable electrode, plate electrode, cantilever), as shown schematically in FIG. 1. These electrodes are covered with a top and bottom dielectric layer. Additionally, there is an RF-electrode below the movable MEMS element between or adjacent to the pull-down electrodes. Between the movable plate and the RF-electrode there is a gap that is modulated by the voltages applied to either the PU or the PD-electrode. These voltages result in electrostatic forces, which pull the movable electrode either up or down in contact with the dielectric layers to provide a stable minimum or maximum capacitance to the RF-electrode. In this way the capacitance from the movable plate to the RF-electrode can be varied from a high capacitance state $C_{max}$ when pulled to the bottom (See FIG. 2) to a low capacitance state $C_{min}$ when pulled to the top (See FIG. 3).

The RF signal present on the RF-electrode can couple to the PD-electrode through the dielectric layer, as shown in FIG. 4, resulting in electrostatic forces pulling on the movable electrode above it. The plate will deform due to these electrostatic forces which can result in a modulation of the $C_{max}$ by the RF-signal. This capacitance modulation leads to a harmonic distortion of the RF-signal.

Therefore, there is a need in the art for a MEMS DVC device with minimal or no harmonic distortion of the RF signal.

SUMMARY OF THE INVENTION

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to the one or more electrodes that cause the plate to move is reduced and capacitance modulation is reduced or even eliminated.

In one embodiment, a MEMS DVC comprises a first dielectric layer having a first electrode, an RF electrode, and a shielding electrode disposed therein wherein the shielding electrode is dispose adjacent the RF electrode and the first electrode and wherein the shielding electrode is grounded; a second dielectric layer disposed over the first electrode, the RF electrode and the shielding electrode; a second electrode disposed opposite the first electrode and having a third dielectric layer thereover; and a movable electrode movable from a position in contact with the second dielectric layer and a position in contact with the third dielectric layer.

In another embodiment, method of manufacturing a MEMS DVC comprises depositing an electrically conductive layer over a substrate; patterning the electrically conductive layer to form a first electrode, an RF electrode and a shielding electrode, wherein the shielding electrode is disposed adjacent the RF electrode and the first electrode; depositing a first dielectric layer over the substrate, the first electrode, the RF electrode and the shielding electrode; planarizing the first dielectric layer to expose the first electrode, the RF electrode and the shielding electrode; depositing a second dielectric layer over the exposed electrodes and the first dielectric layer; and forming a moving electrode above the second dielectric layer, wherein the moving electrode is movable from a first position in contact with the second dielectric layer and a second position spaced from the second dielectric layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present invention generally relates to a MEMS DVC having a shielding electrode structure between the RF electrode and one or more other electrodes that cause a plate to move. The shielding electrode structure may be grounded and, in essence, block or shield the RF electrode from the one or more electrodes that cause the plate to move. By shielding the RF electrode, coupling of the RF electrode to the one or more electrodes that cause the plate to move is reduced and capacitance modulation is reduced or even eliminated.

Figure 1:
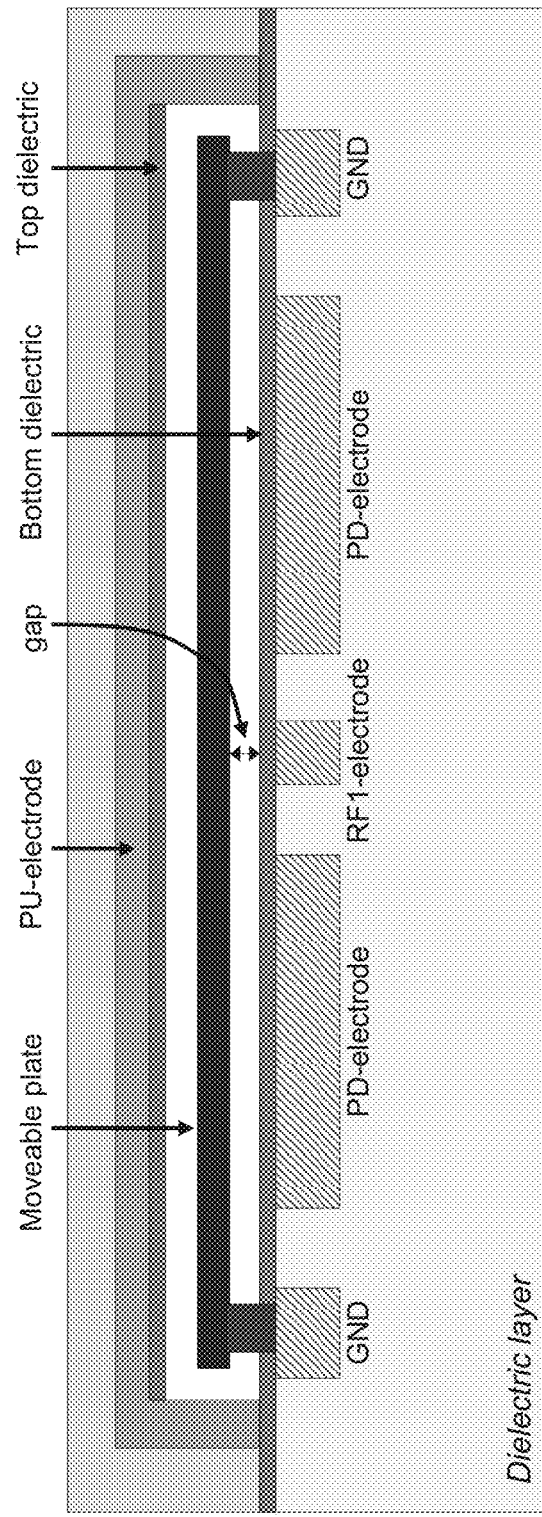
FIG. 1 is a schematic cross-sectional illustration of a MEMS DVC in the free standing state.
Figure 2:
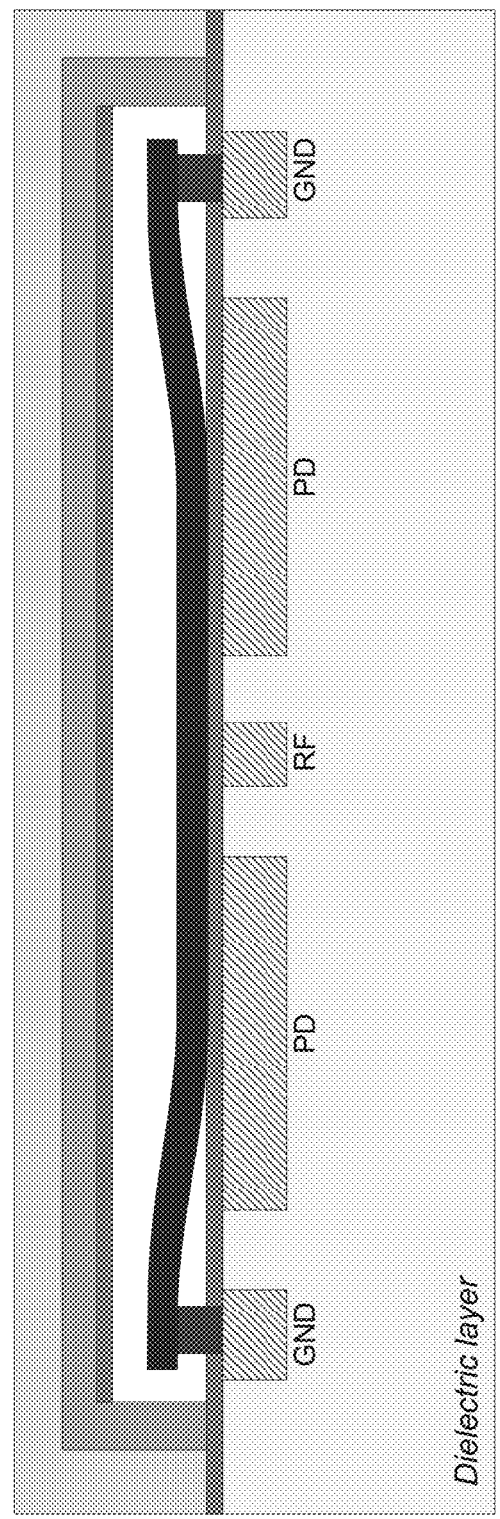
FIG. 2 is a schematic cross-sectional illustration of the MEMS DVC of FIG. 1 in the $C_{max}$ state.
Figure 3:
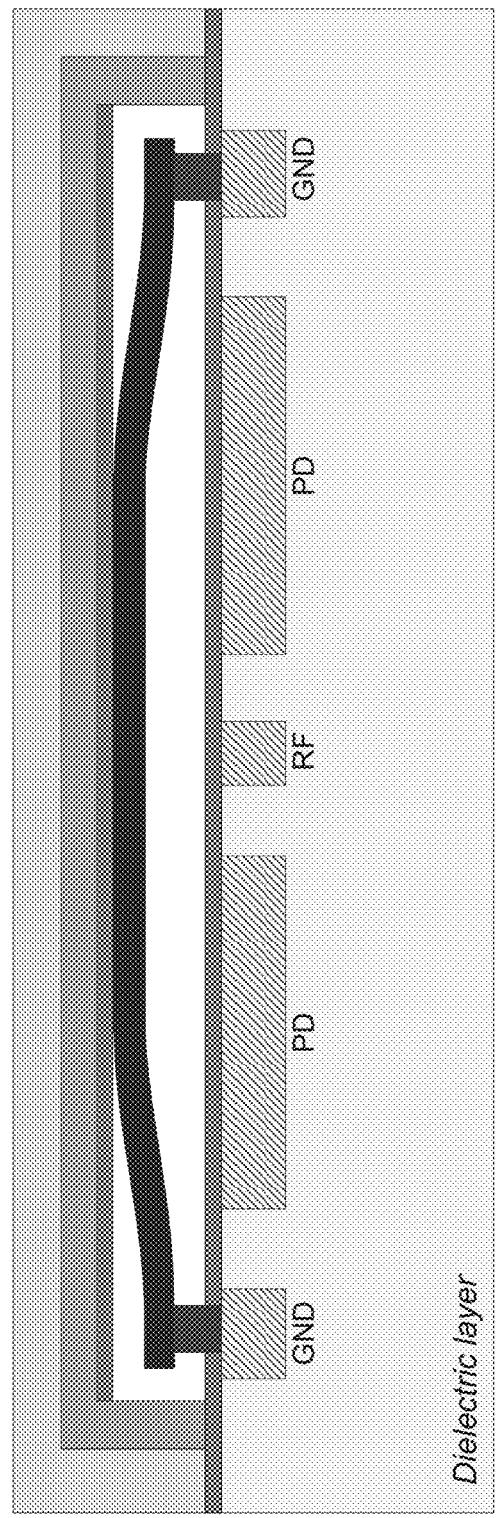
FIG. 3 is a schematic cross-sectional illustration of the MEMS DVC of FIG. 1 in the $C_{min}$ state.
Figure 4:
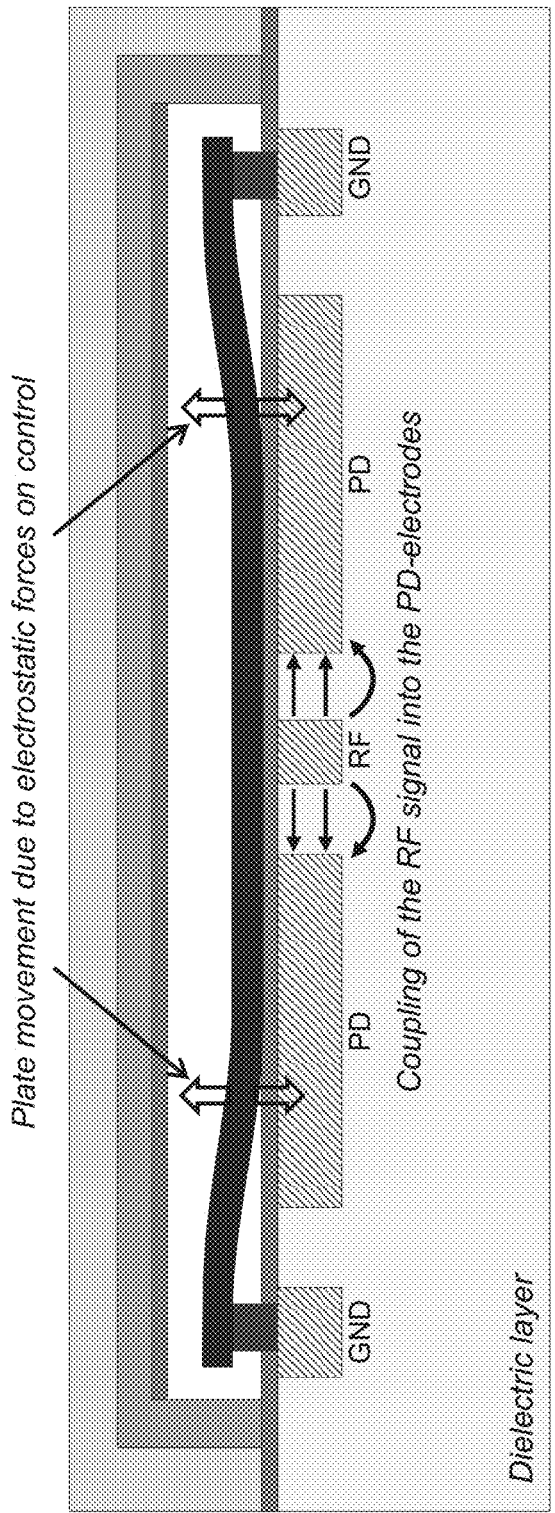
FIG. 4 is a schematic cross-sectional illustration of a MEMS DVC in the $C_{max}$ state showing the impact of the capacitive coupling of the RF-signal into the control electrode.
Figure 5:
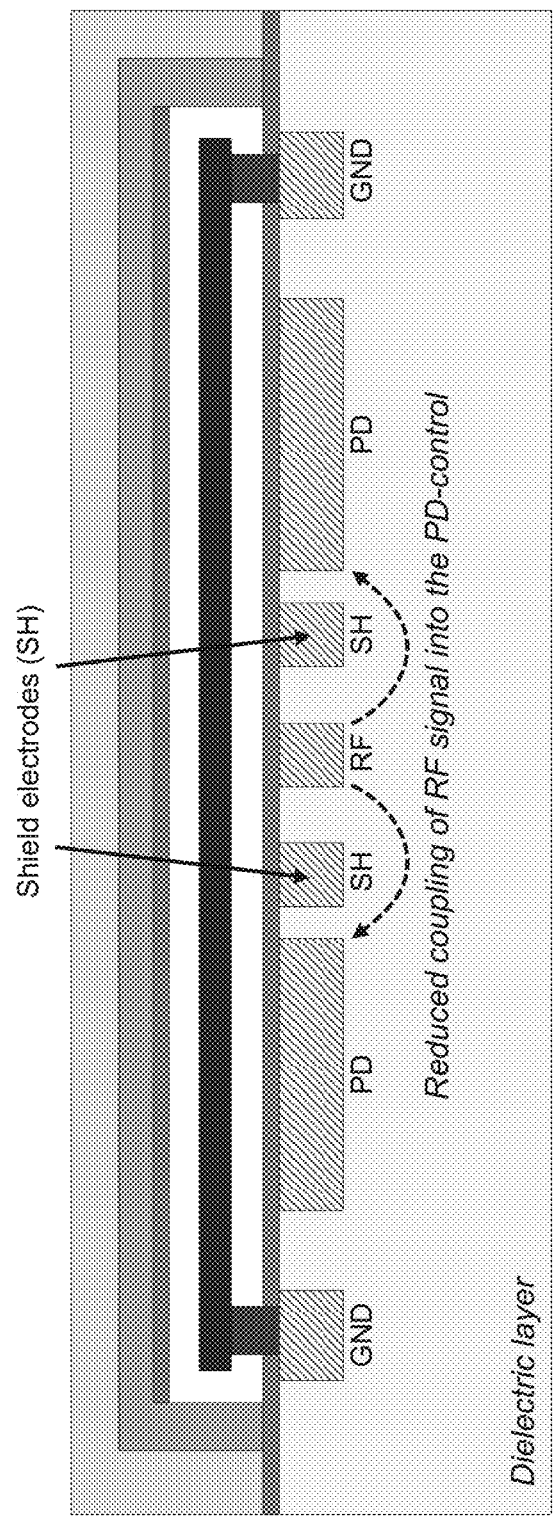
FIG. 5 is a schematic cross-sectional illustration of a MEMS DVC according to one embodiment with a reduced coupling effect from the RF electrode to the pull-down electrode.

FIG. 5 shows a first embodiment which uses lateral shielding electrodes SH placed between the RF-electrode and the PD-electrode to reduce the capacitive coupling between the RF and PD-electrode. The majority of the capacitive coupling occurs between the RF-electrode and the SH-electrode (e.g., shielding electrode). The field-lines between the RF-electrode and the PD-electrode have to travel through the dielectric layer for a longer distance, resulting in a reduced capacitive coupling between RF and PD. The SH-electrodes are electrically connected to the plate (not shown in FIG. 5), i.e. in case of a shunt capacitor this is GND. This embodiment results in a reduced coupling of 3× to 5× compared to the non-shielded solution.

Figure 6:
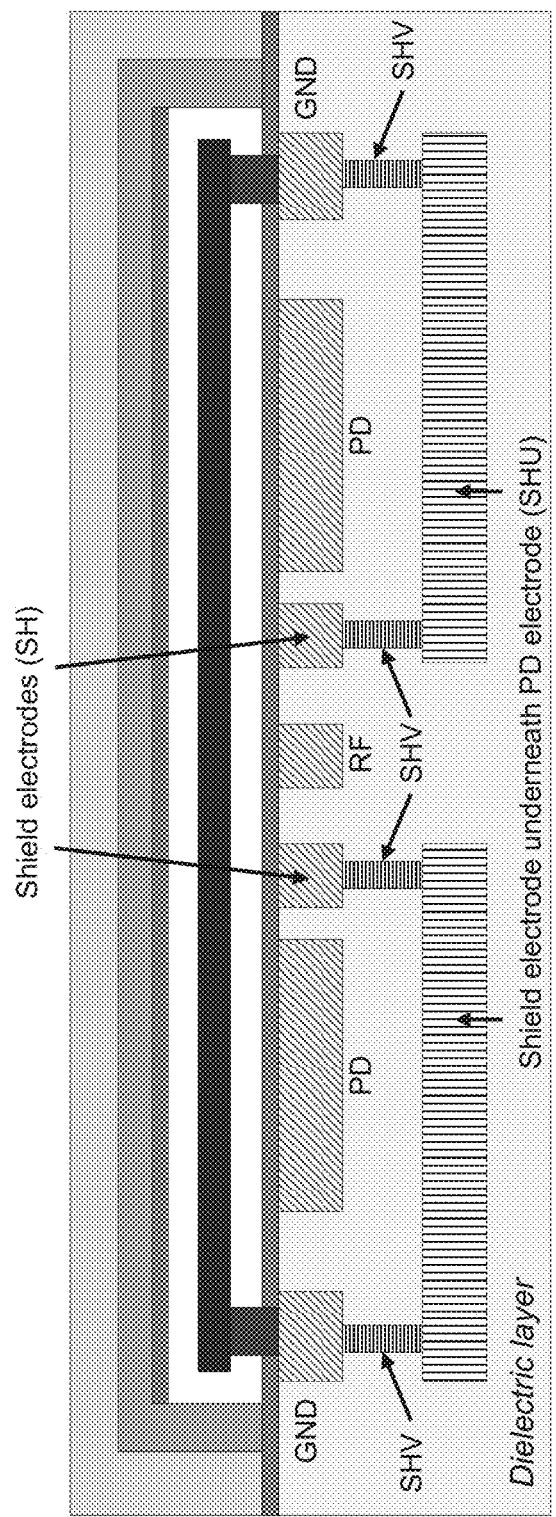
FIG. 6 is a schematic cross-sectional illustration of a MEMS DVC according to another embodiment with a reduced coupling effect from the RF electrode to the pull-down electrode using a full shield underneath the pull-down electrode.

FIG. 6 shows a second embodiment which uses shielding-electrodes SHU (e.g., underneath shielding electrodes) underneath the PD-electrode in addition to the lateral shielding electrodes SH. The SHU-electrodes are connected to SH using an array of shielding vias SHV. In this way a shielding box is created underneath the PD-electrode and the coupling between the RF-electrode and the PD-electrode can be nearly completely eliminated, resulting in a 1000× improvement compared to the non-shielded case. Also in this case the shielding-electrodes are electrically connected to the plate.

Figure 7A:
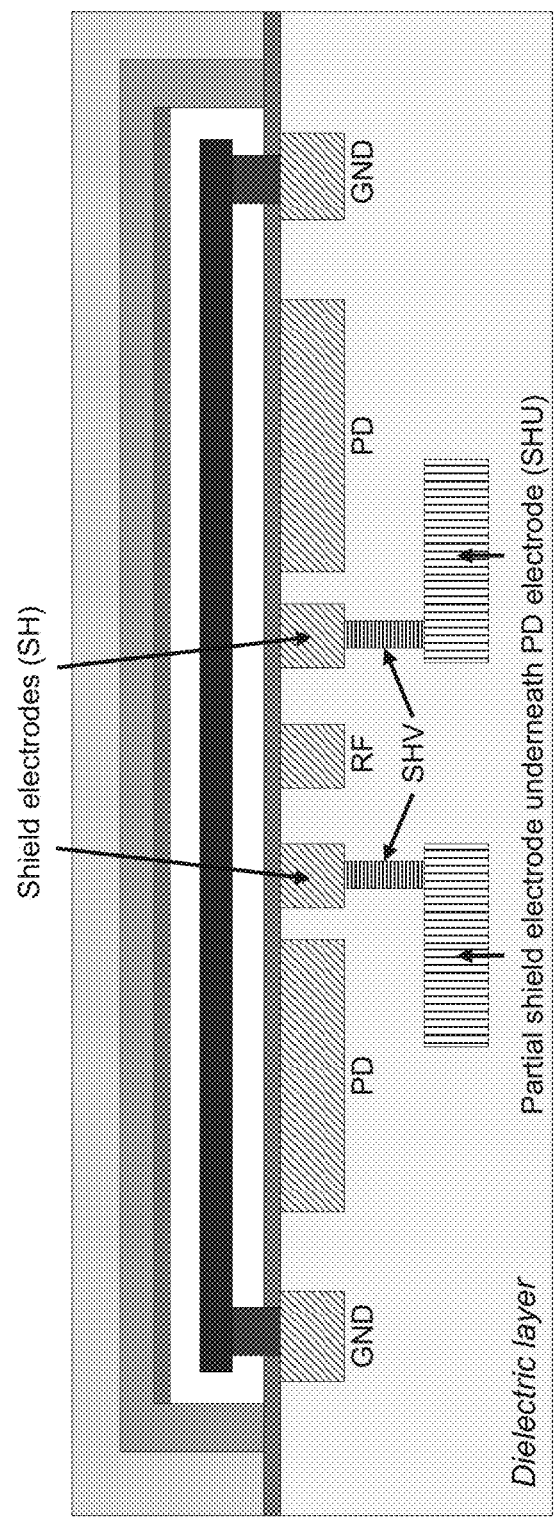
FIG. 7A is a schematic cross-sectional illustration of a MEMS DVC according to another embodiment with a reduced coupling effect from the RF electrode to the pull-down electrode using a partial shield underneath the pull-down electrode.

FIG. 7A shows a third embodiment using a reduced version of the PD shielding. In this case, the shield-electrode SHU does not completely cover the PD-electrode. This shielding method can be just as effective as the complete shielding technique shown in FIG. 6. The advantage of using a partial SHU-shield over a full SHU-shield is the lower stress levels in the SHU metal and surrounding dielectric layer, leading to a more robust manufacturing process.

Figure 7B:
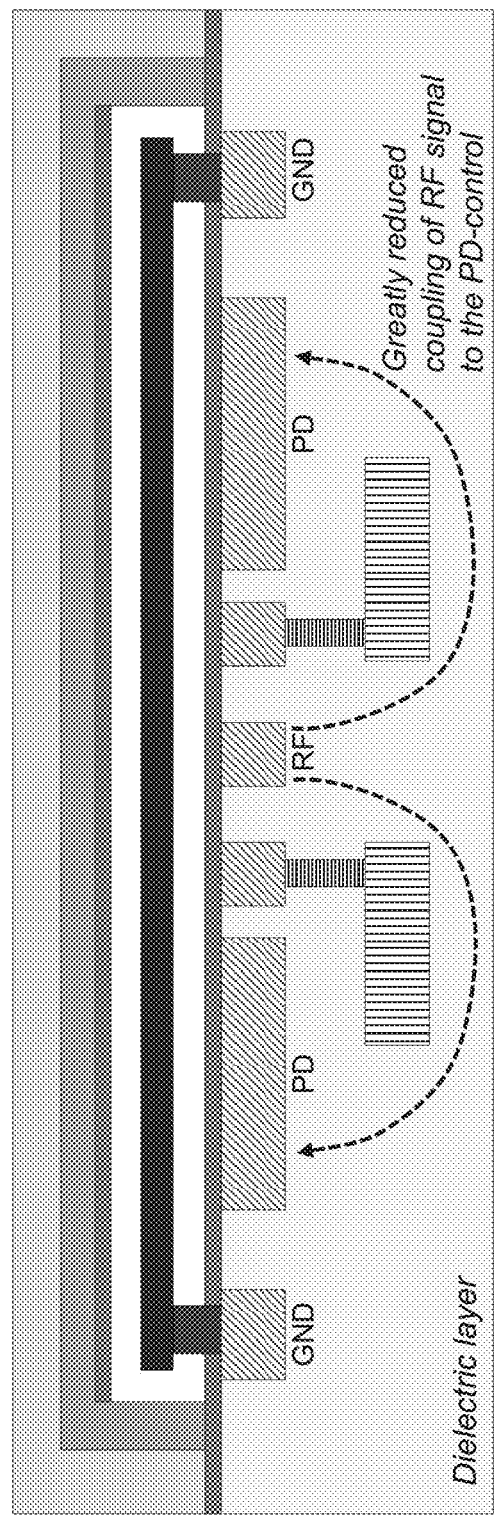
FIG. 7B shows the coupling between the RF electrode and the pull-down electrode of FIG. 7A.

FIG. 7B shows that the field lines from the RF to the PD-electrode with a partial shield electrode have to travel for a much larger distance around the shielding electrodes compared to the embodiment using only lateral shielding SH (FIG. 5). With an appropriate length of the SHU-electrode the same performance as a full-shield SHU electrode can be obtained.

To fabricate the MEMS DVC, a plurality of electrodes may be formed on the substrate. For the embodiments shown in FIGS. 5-7B, the electrodes are formed by depositing an electrically conductive layer, such as aluminum, Titanium-nitride, on the substrate followed by patterning and etching the electrically conductive layer to form two ground electrodes (for coupling to the movable electrode), two pull-down electrodes, one RF electrode and two shielding electrodes. It is to be understood that the number of electrodes shown in FIGS. 5-7B is not to be limiting as more or less electrodes may be present.

A dielectric layer may then be deposited over the substrate and the electrodes to fill the gaps between the electrodes. The dielectric layer is subsequently planarized by means of Chemical Mechanical Polishing (CMP) to result in an essentially planar substrate with the electrodes exposed at the top surface and the gaps between the electrodes filled with the dielectric layer.

A second dielectric layer may then be deposited over the substrate and the electrodes. Openings may be formed through the dielectric layer to expose the ground electrodes which will be electrically connected to the moving electrode. The moving electrode may then be formed of an electrically conductive material such as titanium nitride above the dielectric layer by depositing one or more sacrificial layers, forming an opening through the sacrificial layers to expose the ground electrode, depositing the material for the moving electrode in the opening, on the exposed ground electrode, and over the sacrificial layer. Additional sacrificial layers may be deposited over the moving electrode layer. The sacrificial material may eventually be removed to free the movable electrode to move within a cavity.

A third dielectric layer may be formed over the topmost sacrificial layer and an electrically conductive material may be deposited to form a pull-up electrode. In one embodiment, the electrically conductive material comprises titanium nitride. A sealing layer is formed over the pull-up electrode to seal the cavity. If the sacrificial material is removed after forming the sealing layer, an additional sealing layer may be necessary.

It is to be understood that while reference has been made to a substrate, the substrate may comprise multiple layers, such as multiple dielectric layers. Additionally, it is to be understood that the substrate may refer to any CMOS substrate having numerous structures therein.

As shown in each of FIGS. 5-7B, the shielding electrode extends to a depth within the substrate that is substantially equal to the depth of the pull-down electrode and the RF electrode. It is to be understood that the shielding electrode may extend to a depth that is equal to or greater than the depth that the RF electrode and pull-down electrode extend into the substrate. Additionally, the shielding vias, the shielding electrodes and the underneath shielding electrodes may comprise the same or different electrically conductive material. In one embodiment, the electrically conductive material comprises aluminum, titanium nitride.

As shown in the embodiment of FIG. 6, prior to forming the ground, shielding, pull-down and RF electrodes, underneath shielding electrodes may be formed in the substrate with shielding vias used to connect the shielding electrode to the underneath shielding electrode. Additionally, as shown in FIG. 6, shielding vias may be formed in the substrate to connect the grounding electrodes to the underneath shielding electrodes.

As discussed herein, a design improvement to shield the RF electrode from the pull-down electrode greatly reduces the coupling of the RF signal into the control-electrode to eliminate the capacitance modulation caused by the RF-signal on the PD-electrode. In one embodiment, a lateral shielding electrode SH is added between RF and PD. In another embodiment, in addition to SH, shielding electrodes underneath the PD-electrode (SHU) are also added wherein the shielding electrodes underneath the PD-electrode is connected to the SH-electrodes with an array of shielding vias (SHV). In another embodiment, the shielding electrode underneath the PD-electrode only covers the portion of the PD-electrode closest to the RF-electrode.

While the foregoing is directed to embodiments of the present invention, other and further embodiments of the invention may be devised without departing from the basic scope thereof, and the scope thereof is determined by the claims that follow.

The invention claimed is:

1. A method of manufacturing a micro-electromechanical system (MEMS) digital variable capacitor (DVC), the method comprising:
   depositing an electrically conductive layer over a first dielectric layer;
   patterning the electrically conductive layer to form a first electrode, an RF electrode, a ground electrode and a shielding electrode, wherein the shielding electrode is disposed adjacent the RF electrode and the first electrode, wherein the shielding electrode is grounded;
   depositing a second dielectric layer over a substrate, the first electrode, the RF electrode, the ground electrode and the shielding electrode;
   planarizing the second dielectric layer to expose the first electrode, the RF electrode, the ground electrode and the shielding electrode;
   depositing a third dielectric layer over the exposed first electrode, the RF electrode, the ground electrode, the shielding electrode, and the second dielectric layer;
   forming a moving electrode above the third dielectric layer;
   forming a fourth dielectric layer over the moving electrode; and
   forming a second electrode over the fourth dielectric layer, wherein the second electrode is disposed opposite the first electrode, wherein the moving electrode is movable from a first position in contact with the third dielectric layer and a second position in contact with the fourth dielectric layer.

2. The method of claim 1, further comprising, prior to depositing the electrically conductive layer, forming a first via hole in the substrate and forming a first shielding via in the first via.

3. The method of claim 2, wherein the first shielding via is coupled to the shielding electrode.

4. The method of claim 3, further comprising, prior to forming the first via hole, forming an underneath shielding electrode in the substrate.

5. The method of claim 4, wherein the underneath shielding electrode is coupled to the first shielding via.

6. The method of claim 5, wherein the underneath shielding electrode is coupled to the ground electrode.

7. The method of claim 6, further comprising forming a second via hole in the substrate to expose the underneath electrode and depositing an electrically conductive material within the second via hole to form a second shielding via, wherein the ground electrode is coupled to the second shielding via.

8. The method of claim 2, further comprising, prior to forming the first via hole, forming an underneath shielding electrode in the substrate.

9. The method of claim 8, wherein the underneath shielding electrode is coupled to the first shielding via.

10. The method of claim 9, wherein the underneath shielding electrode is coupled to the ground electrode.

11. The method of claim 10, further comprising forming a second via hole in the substrate to expose the underneath electrode and depositing an electrically conductive material within the second via hole to form a second shielding via, wherein the ground electrode is coupled to the second shielding via.

* * * * *